Patented Oct. 28, 1952

2,615,808

UNITED STATES PATENT OFFICE 2,615,808

PREPARATION OF COTTONSEED MEAL

James V. Rice, Cincinnati, Ohio, assignor to Buckeye Cotton Oil Company, Memphis, Tenn., a corporation of Ohio No Drawing. Application October 17, 1949, Serial No. 121,897

11 Claims. (Cl. 99—2)

The present invention relates to the production of a substantially non-toxic solvent extracted cottonseed meal.

It is known that the oil in flaked cottonseed meats may be suitably extracted with hexane or other relatively low boiling aliphatic hydrocarbon oil solvent such as pentane, heptane, cyclohexane, and their commercial mixtures which sometimes include methyl pentane, dimethyl pentane, methyl butane, and dimethyl butane. It is also known that unsaturated aliphatic hydrocarbons such as hexene, heptene and those hydrocarbons resulting from the polymerization of olefins derived in petroleum cracking operations, as well as halogenated hydrocarbons, may be used.

When such aliphatic hydrocarbon solvents are employed for the purpose of extracting oil from flaked cottonseed meats, the color glands of the flakes, sometimes referred to as "resin cavities," remain intact except of course for those glands which are mechanically fractured or ruptured in the preparation and handling of the meats during processing.

One of the principal constituents of the intact glands is gossypol, which is well known as a toxic substance for single-stomached animals. Thus, spent cottonseed flakes resulting from ordinary hexane extraction of flaked cottonseed meats is unsuitable for use as a feed for swine and chickens for example, and cannot be safely used until the gossypol contained therein is removed or converted to a non-toxic form.

Present well-known methods of detoxification include heating in the presence of moisture, and extraction with solvents for gossypol, such as ethyl ether for example.

Heating the spent flakes in the presence of moisture effects some thermal denaturing of protein contained in the flakes and causes darkening in color. Conditions necessary to detoxify solvent extracted cottonseed flakes substantially completely are such as to denature a substantial portion of the protein, thus effecting reduction in the food value of the final meal. As indicated above, darkening of the meal simultaneously occurs and the trade has come to associate low protein value with such dark color.

Extraction of the substantially oil-free spent flakes with a gossypol solvent such as ethyl ether effectively removes the toxic content of the flakes without effecting denaturing of the contained protein, but it is obvious that such extraction procedures are uneconomical and therefore impractical in the production of a non-toxic food which will meet market competition, even though the undenatured protein content is higher.

More recently an extraction process covered by application Serial No. 26,454, filed May 11, 1948, now U. S. Patent 2,484, 831, has been successfully used in the production of a substantially non-toxic cottonseed meal. This process involves extracting the oil with a hydrocarbon and methanol solvent mixture and although it has represented a distinct advance in the art of making a substantially non-toxic cottonseed meal of high nutritive value it has introduced certain operational problems which, advantageously, are not encountered in the practice of the present invention. These are more fully dealt with below.

It is an object of the present invention to provide an improved process for the production of a solvent extracted cottonseed meal having an exceptionally low toxicity factor, high nutritive value, and attractive color.

In accordance with the broad aspects of the present invention, the spent cottonseed flakes, containing from about 1% to about 3% residual oil after extraction with hexane or other suitable aliphatic hydrocarbon or chlorinated hydrocarbon solvent, are first intimately contacted with a water-soluble aliphatic solvent as hereinafter more fully defined to cause disintegration of the color glands and liberation and diffusion of the gossypol. This mixture is thereafter subjected to an elevated temperature not substantially higher than 250° F. whereby substantially all solvent is distilled off and liberated gossypol is simultaneously caused to form a non-toxic complex with the protein, sometimes referred to as "bound gossypol."

In the present process the use of a water-soluble solvent in concentrated form causes rapid disintegration of gossypol glands and diffusion of the liberated gossypol throughout the spent flakes to permit intimate contact with protein. The intimacy of contact thus established permits detoxification at a minimum temperature during distillation of solvent, with minimum denaturing and darkening of protein. Moreover, the high degree of diffusion of detoxified gossypol throughout the treated meal results in a uniform pleasing yellow color which is desirable and advantageous in subsequent marketing.

The contact time required to effect disintegration of gossypol glands and diffusion of gossypol by the water-soluble solvent will vary depending on temperature and solvent used. Under preferred conditions of operation the desired result is achieved in a contact time of 8 to 10 minutes, and in some cases marked improvement may be effected in contact times as short as 2 minutes. No harm is realized if the contact is permitted to take place over an extended period, but usually periods of contact in excess of 30 miutes are unnecessary.

Disintegration and diffusion may be effected in a minimum time with a minimum of aliphatic water-soluble solvent by subjecting the mixture of spent cottonseed flakes and water-soluble solvent to an attrition step whereby the color glands are fractured mechanically and the contained gossypol is liberated for diffusion and contact with the protein of the meal in the presence of the water-soluble solvent. Such a procedure may be effectively carried out by subjecting the spent flakes (which may contain residual oil extraction solvent) in admixture with added aliphatic water-soluble solvent to attrition, as by a grinding operation or the equivalent thereof, whereby mechanical fracture of the color glands is effected in the presence of the water-soluble solvent.

The amount of aliphatic water-soluble solvent required for use in the practice of the present invention is at least 0.1 times the weight of the spent cottonseed flakes figured on a solvent-free basis. Higher ratios of aliphatic water-soluble solvent such as 0.8 may, of course, be employed and the desired result will usually be achieved in a period of time decreasing with increase with the solvent ratio. However, it is preferable to use the minimum amount of solvent to effect disintegration and diffusion in a practical time so that solvent usage and cost may be held at an economical level. I have found that in practical operation the amount of solvent preferably used is about .3 to about .5 times the weight of the spent flakes on a solvent-free basis. It should be noted here that, as more fully described below, this treatment with water-soluble solvent in my process is not a procedure for the extraction of gossypol from the spent flakes.

The purity of the aliphatic water-soluble solvent insofar as its water content is concerned is not critical. Substantially pure solvent may be employed, but it has been found that it is preferable to have some water present during the treatment because rupture of the color glands thereby appears to be facilitated. However, it is preferable that the amount of water in the aqueous aliphatic water-soluble solvent mixture does not exceed 50 per cent by weight. One of the advantages of the present process lies in the permissible use of wet water-soluble solvent. Precise fractionation and purification in recovery procedures are therefore unnecessary and recovery costs are held at a minimum.

The effect of the water-soluble solvent is of course more pronounced at higher temperatures and in normal operations wherein the spent flakes discharge from the extractor at 120°–130° F., such temperatures can be used conveniently and are preferred. However, the benefits of my invention are obtainable at both lower and higher temperatures, a practical range being from about 70° F. to about 140° F.

Aliphatic water-soluble solvents which are useful in the practice of the present invention include methanol, ethanol, propanol, isopropanol, acetone, and dioxane. These solvents are soluble in water in all proportions and are readily vaporizable at temperatures not substantially higher than 220° F. Removal of the solvent from the treated meal therefore can be effected without appreciable heat denaturing of the protein.

In accordance with the invention the mixture of spent flakes and water-soluble solvent, after sufficient contact to effect disintegration and diffusion, is subjected to a desolventizing step wherein the solvent is distilled from the mixture. As indicated above, the application of heat at this stage of the process is essential for detoxification of gossypol and accordingly the distillation is conducted at a temperature in excess of 140° F. Ordinarily desolventization is effected at about 160° F. to about 170° F., the temperature being carried to about 230° F. for a brief period at the final stages to insure maximum desolventization and combination of the liberated and diffused gossypol with the protein. A maximum time of about 20 minutes at 230° F. is preferred but of course if facilities are available for rapid and efficient handling of the flakes a higher temperature such as 250° F. can be tolerated for short periods such as 10 minutes. However, final temperature to which the desolventized meal is subjected is preferably held below 250° F. to minimize denaturing of protein.

After removal of the solvent by distillation at an elevated temperature as indicated, the detoxified spent flakes are allowed to cool and then are subjected to grinding, screening and sacking preparatory to distribution on the market.

By the above process the meal can be rendered substantially non-toxic, suitable for use directly as feed for chickens and swine. The free gossypol content by the analytical method of F. H. Smith (Analytical Edition of Ind. and Eng. Chem., vol. 18, page 43, January 15, 1946), a method which gives one of the highest determinations for free gossypol of any accepted analytical method, is well below 0.05 per cent and can be reduced to 0.02 without difficulty. It is to be noted specifically, for example, that the Smith method for gossypol determination herein referred to, at such low levels of free gossypol content, gives values which are in the neighborhood of ten times those values obtained in the use of the analytical method described in the aforementioned U. S. Patent 2,484,831.

Although the spent cottonseed flakes may be substantially freed of hexane or other oil solvent before treatment in accordance with this invention, such complete removal is wholly unnecessary. The gravity drained spent flakes and hexane mixture may be used directly and in such instances as much as 70–80 per cent oil solvent may be present in the mixture without harm. The amount of water-soluble solvent used is not dependent on this content of oil solvent. Rather, as indicated above, the usage is from 0.1 to 0.8 part by weight water-soluble solvent per 1 part solvent-free spent flakes, irrespective of the oil-solvent content.

The invention will be more fully understood from the following examples wherein preferred conditions of operation are given. It is to be understood that the invention is not so limited in nature and that obvious variations in conditions and handling may be practiced without departing from the spirit of the invention.

*Example 1.*—The process of the present invention was practiced on spent cottonseed flakes in the following manner.

The spent flakes employed were recovered directly from the extraction apparatus (gravity drained) and were constituted as follows:

|  | Pounds |
|---|---|
| Extracted flakes (of which an amount equal to 50 pounds was unextracted oil) | 6238 |
| Water | 922 |
| Hexane | 16,660 |

To the above mixture at about 130° F. were added 2064 pounds of methanol. The methanol was intimately mixed with the spent flakes and contact was permitted to take place for about 10 minutes. At the end of this period, the temperature was about 115° F.

The resulting mixture after contact with the methanol was transferred to a desolventizer wherein the methanol and hexane and some water were removed by distillation, the maximum temperature reached being 212° F. The residue recovered consisted of 7063 pounds of substantially non-toxic cottonseed meal containing 725 pounds of undistilled solvent and water. Further treatment at a maximum temperature of 230° F. for 20 minutes removed additional volatile material. By analysis according to the Smith method the free gossypol content of the recovered meal was 0.03%.

*Example 2.*—In this example 10 parts by weight of gravity drained hexane extracted cottonseed flakes (about 60% hexane) were mechanically mixed with 2 parts by weight of ethanol for 30 minutes at about 80° F. The mixture was then heated to 160° F. in order to distill off a major proportion of the solvent. The temperature was then raised to 230° F. and held for 20 minutes. The free gossypol content of the recovered meal was 0.03% as compared with 0.55% in the spent flakes (solvent-free basis) before treatment.

Another sample of the spent flakes was processed in exactly the same manner but omitting treatment with ethanol. The resulting meal contained 0.52% free gossypol.

Marked reductions in free gossypol content were also noted by treatment of extracted meals in accordance with the process of the above example by the substitution of (1) isopropyl alcohol, (2) propyl alcohol, (3) methyl alcohol, (4) acetone, and (5) dioxane, for the ethyl alcohol of Example 2. All other conditions of treatment were the same.

In the above Example 2 and in all of the variations thereof it was observed that treatment of the spent flakes with the water-soluble solvent did not of itself effect appreciable reduction in free gossypol content. This was learned by analyzing treated flakes from which the water-soluble solvent was removed by evaporation at normal room temperatures in the range of 70–80° F., no subsequent heating step being employed. In all cases, processing operations involving distilling the solvent from the treated spent flakes coupled with the application of heat, limited, however, to a degree insufficient to effect substantial denaturing of protein, was found to be essential in achieving the desired results.

*Example 3.*—In this example cottonseed meats containing 0.96% free gossypol were flaked to a thickness of 0.005″–0.008″ and conditioned to about 10% moisture content. These flakes were extracted with hexane in the normal way. Gravity drained spent flakes, 10 parts by weight, were mixed with 1 part by weight of methanol containing about 5% of water, agitated for 30 minutes, and desolventized as described in Example 2, water, methanol and hexane being distilled off and recovered as two phases, aqueous methanol and hexane. The recovered meal was bright yellow in color and contained 0.05% free gossypol. Similar treatment of another sample of the spent flakes without the use of methanol resulted in a product containing 0.69% free gossypol.

By subjecting the mixture of methanol and spent flakes of the above example to attrition in a stone mill prior to desolventizing the period of contact can be reduced from 30 to about 5 minutes without significant effect on the free gossypol content of the final meal.

The action of the water-soluble solvent in the process of this application appears to be distinctly different from that of the methanol used in the process of U. S. Patent 2,484,831. Whereas significant reduction in free gossypol content is effected by contact of the flaked meats with the mixture of hydrocarbon solvent and methanol in the process of the earlier application, no such significant reduction is effected by mere contact of the spent flakes with the water-soluble solvent in the present process. However, the treatment of the spent flakes with water-soluble solvent after extraction of oil has been effected apparently liberates and diffuses the gossypol to such a high degree that almost complete detoxification can be brought about by the relatively mild heat treatment accompanying distillation of the solvent, thereby reducing heat denaturing of the protein to a minimum.

Moreover, the specific treatment by my process is distinctive in that water-soluble solvents other than methanol are operative.

It has been found also that in effecting oil extraction with a hydrocarbon solvent instead of a mixture of same with methanol, tendencies toward swelling of flakes and closure of interstices due to collapse and swelling, are markedly reduced and thinner flakes may be employed in the oil extraction step. In addition, since the boiling points of hydrocarbons, such as commercial hexane, which are normally used in oil-extraction procedures, are higher than mixtures of same with methanol, higher temperatures of extraction may be used. These differences add up to higher efficiency in oil extraction.

It has been observed also that the use of methanol along with hydrocarbon solvent tends to extract sugars and other carbohydrates along with oil despite efforts to hold the water content of the solvent mixture to a minimum. These materials concentrate in the foots resulting from the caustic refining of the recovered extracted oil. Absence of these materials in oils extracted with straight hydrocarbon, as is permissible in the present process, results in foots on caustic refining which yield fatty acids of higher quality.

Moreover, whereas the absence of water in the solvent mixture used in the process of the earlier application is advantageous, large quantities are permissible in the present process as above described, and in fact the presence of some water is preferred. This works to a distinct operational advantage in that the vapors driven off in the desolventization step of the instant process need not be carefully fractionated and purified to eliminate the water content. The condensed water-soluble solvent, containing up to 50 per cent by weight of water is readily separated by mere gravity separation from any hydrocarbon solvent which may be distilled over in the desolventization step, and may be directly re-used in the treatment of a subsequent batch of spent flakes according to my process. An appreciable lowering of operation costs is thereby effected. With regard to this matter of solvent recovery it has been noted that substantially quantitative recovery of the water-soluble solvent used is possible in the practice of my process.

I claim:

1. A process for the detoxification of solvent extracted cottonseed flakes containing intact glands comprising free gossypol, which comprises intimately contacting said flakes with a completely water-soluble aliphatic solvent, having at normal atmospheric pressure a boiling point not substantially higher than 220° F., for at least 2 minutes and until substantially all gossypol has been liberated from the glands and is diffused throughout the flakes, and distilling substantially all solvent from the mixture at a temperature in excess of 140° F. but insufficient to effect substantial heat denaturing of protein, whereby substantially all solvent is removed from the mixture in the vapor phase without substantial removal of gossypol and whereby substantially all gossypol is converted to non-toxic form.

2. The process of claim 1 in which the water-soluble solvent is methanol.

3. The process of claim 1 in which the water-soluble solvent contains some water but not more than an equal amount by weight.

4. The process of claim 1 in which the weight of water-soluble solvent is not less than 0.1 times the weight of solvent-free extracted cottonseed flakes.

5. A process for the detoxification of solvent extracted cottonseed flakes containing intact glands comprising free gossypol, which comprises intimately contacting said cottonseed flakes, wetted with an aliphatic oil extraction hydrocarbon solvent, with a completely water-soluble aliphatic solvent, having at normal atmospheric pressure a boiling point not substantially higher than 220° F., for at least 2 minutes and until substantially all gossypol has been liberated from the glands and is diffused throughout the flakes, and, without separation of substantial gossypol from the treated flakes, distilling substantially all solvent from the mixture at a temperature in excess of 140° F. but not substantially in excess of 250° F. and insufficient to effect substantial heat denaturing of protein.

6. A process for detoxifying the residue resulting from the solvent extraction of oil from cotton seed meats, which residue contains intact glands comprising toxic gossypol, which comprises adding to said residue a completely water-soluble aliphatic solvent having boiling point at normal atmospheric pressure not substantially higher than 220° F., subjecting the mixture to attrition, the time of contact of said residue with said water-soluble solvent being at least 2 minutes, and until substantially all gossypol has been liberated from the glands and is diffused throughout the residue, and thereafter, without effecting separation of substantial gossypol from the treated residue, distilling substantially all solvent from the mixture at a temperature in excess of 140° F. but insufficient to effect substantial denaturing of protein.

7. The process of claim 6 in which the water-soluble solvent is methanol.

8. A process for detoxifying the residue resulting from the extraction of oil from cottonseed meats, which residue contains intact glands comprising toxic gossypol and which is wetted with an aliphatic hydrocarbon oil extraction solvent, comprising intimately contacting said residue at a temperature from about 70° F. to about 140° F. with from about 0.1 to about 0.8 times the weight of the residue on a solvent-free basis, of methanol for from 2 minutes to about 30 minutes, and until substantially all free gossypol has been liberated from the glands and is diffused throughout the residue, and at a temperature above 140° F. but not substantially exceeding 250° F. and insufficient to effect substantial heat denaturing of protein, distilling substantially all solvent from the mixture, whereby removal of solvent is effected in the vapor phase without substantial removal of gossypol and whereby substantially all gossypol is converted to non-toxic form.

9. The process of claim 8 in which the intimate contact of residue with methanol is assisted by subjecting the mixture to attrition.

10. A process for the detoxification of solvent extracted cottonseed flakes containing intact glands comprising free gossypol, which comprises intimately contacting said flakes with a water-soluble solvent, having at normal atmospheric pressure a boiling point not substantially higher than 220° F., for at least 2 minutes and until substantially all gossypol has been liberated from the glands and is diffused throughout the flakes, said solvent containing water but not more than 50 percent by weight thereof and being recovered from a previous treatment cycle; then, without separation of substantial gossypol from the treated flakes, distilling substantially all solvent and some water from the mixture at a temperature in excess of 140° F. but insufficient to effect substantial heat denaturing of protein; and recovering the distilled mixture of water and water-soluble solvent for use in a subsequent treatment cycle.

11. A process for detoxifying the residue resulting from the extraction of oil from cottonseed meats with hexane, which residue contains intact glands comprising toxic gossypol and which is wetted with hexane, comprising intimately contacting said residue at a temperature from about 70° F. to about 140° F. with from about 0.1 to about 0.8 times the weight of the residue on a solvent-free basis, of methanol for from 2 minutes to about 30 minutes and until substantially all free gossypol has been liberated from the glands and is diffused throughout the residue, said methanol containing water but not more than 50 percent by weight thereof and being recovered from a previous treatment cycle then, without separation of substantial gossypol from the treated residue, distilling substantially all methanol and hexane and some water from the mixture at a temperature in excess of 140° F. but insufficient to effect substantial heat denaturing of protein; collecting the distilled hexane, methanol and water as two liquid layers; and separating the aqueous methanol layer and recovering same for use in a subsequent treatment cycle.

JAMES V. RICE.

REFERENCES CITED

The following references are of record in the file of this patent:

Cottonseed and Cottonseed Products by A. E. Bailey, published 1948 by Interscience Publishers, Inc., New York, pages 322, 626, 644 and 650.